United States Patent [19]
Rennex et al.

[11] Patent Number: 5,563,466
[45] Date of Patent: Oct. 8, 1996

[54] MICRO-ACTUATOR

[76] Inventors: Brian G. Rennex, 431 Muddy Branch Rd., #101, Gaithersburg, Md. 20878; Stephen M. Bobbio, 209 Oak Crest Dr., Wake Forest, N.C. 27587

[21] Appl. No.: 72,856

[22] Filed: Jun. 7, 1993

[51] Int. Cl.[6] .................................................. H02N 1/00
[52] U.S. Cl. ............................................. 310/309; 318/116
[58] Field of Search .................................. 310/309, 310; 318/116; 361/233, 234; 200/1 R

[56] References Cited

U.S. PATENT DOCUMENTS

| | | | |
|---|---|---|---|
| 2,975,307 | 3/1961 | Schroeder | 310/309 U X |
| 5,051,643 | 9/1991 | Dworsky | 310/309 |
| 5,124,879 | 6/1992 | Goto | 310/233 |
| 5,206,557 | 4/1993 | Bobbio | 310/309 |

Primary Examiner—R. Skudy

[57] ABSTRACT

This invention incorporates micro-machining fabrication techniques to achieve practical electrostatic actuation forces over a length change of the order of 20 to 50 percent. It constitutes an improvement over the prior art by virtue of array designs which yield a more versatile and stronger actuator. One basic design utilizes diamond-shaped attractive elements to transmit transverse forces for longitudinal, two-way actuation. Another basic design features interlocking, longitudinally attractive elements to achieve longitudinal, two-way actuation. Other improvements include means for locking the actuator at an arbitrary displacement as well as means for amplification of either the actuation force or length change.

15 Claims, 17 Drawing Sheets push mode top view of top top view of top

MICRO-ACTUATOR

BACKGROUND OF THE INVENTION

This invention relates to electromechanical transducers and more particularly to electromechanical transducers comprising microminiature elements and methods for their manufacture. Their principle of operation is the attraction of oppositely charged micro-elements which have been manufactured using high resolution fabrication methods developed for integrated circuit production. This allows the elements to be as small as the order of microns, and it allows the separation between capacitive elements to be of the order of microns. As will be seen, the actuation force is inversely proportional to the square of the separation distance, and it is large enough to be of practical use for the separations of the order of microns.

A number of researchers have recently become active in the field of micro-machining. The most pertinent work for this patent is described in Copending application Ser. No. 07/619,183 filed Nov. 27, 1990 by co-inventor Stephen M. Bobbio and entitled "Microelectromechanical Transducer and Fabrication Method," the disclosure of which is incorporated herein by reference. Described is an electromechanical transducer which features a small separation between plates and which avoids the need for individual discrete wiring to each plate.

The Bobbio transducer is formed of a plurality of electrically conductive strips arranged in an array, with adjacent portions of the strips being maintained in a closely spaced relation by a series of spacers positioned between the adjacent portions of the strips. The spacers have electrically conductive portions to distribute the electrical signal within the transducer, thereby forming an internal distribution network and obviating the need for discrete electrical connections to made to each conductive strip in the transducer. The strips are preferably made of flexible dielectric material having an electrically conductive layer on selected outer surfaces thereof. The dielectric strips and spacers are preferably formed from a common dielectric layer using microelectronic fabrication techniques to thereby greatly simplify fabrication and avoid the need for assembling a myriad of microscopic elements.

The transducer of Bobbio was designed with the following goals in mind. Microelectromechanical transducers must be electrically and mechanically robust, so that they can be fabricated with high manufacturing yields and operated over extended periods of time without breakdown. In particular, because of the large numbers of electrical conductors which must be formed in a microelectromechanical transducer, the transducer should be designed so that electrical shorts do not occur during the manufacturing process and during operation over a normal lifetime. Moreover, the structure must be mechanically robust so that it can withstand the various manufacturing processes which are used to fabricate the structure, and can also withstand operation over an extended operational lifetime. Mechanical robustness is particularly important for microelectromechanical transducers, which by their very nature are required to move during normal operation.

The manufacturing processes for the microelectromechanical transducer should also produce high yields for the device. The manufacture of these transducers should also preferably use processes and materials which have heretofore been widely used in the manufacture of similar devices such as integrated circuits.

OBJECTIVES

It is therefore an object of the present invention to provide an electromechanical transducer called here a microactuator having a large number of conductive plates with a small separation between adjacent plates.

It is another object of the present invention to provide a microactuator which requires a small operating voltage and which avoids the need for individual discrete wiring to each component plate.

It is yet another object of the present invention to provide a microactuator capable of a large and continuously variable displacement of the order of 20 to 50%, or more.

It is yet another object of the present invention to provide a microactuator that is readily and economically fabricated using micro-electronics fabrication techniques.

SUMMARY OF THE INVENTION

This invention incorporates micro-machining fabrication techniques to achieve practical electrostatic actuation forces over a length change of the order of 20 to 50 percent. It constitutes an improvement over the prior art by virtue of array designs which yield a more versatile and stronger actuator. One basic design utilizes diamond-shaped attractive elements to transmit transverse forces for longitudinal, two-way actuation. Another basic design features interlocking, longitudinally attractive elements to achieve longitudinal, two-way actuation. Other improvements include means for locking the actuator at an arbitrary displacement as well as means for amplification of either the actuation force or length change.

DESCRIPTION

The present invention will now be described more fully hereinafter with reference to the accompanying drawings, in which a preferred embodiment of the invention is shown. This invention may, however, be embodied in many different forms and should not be construed as limited to the embodiment set forth herein: rather, applicant provides these embodiments so that this disclosure will be thorough and complete, and will fully convey the scope of the invention to those skilled in the art.

The basic idea of this invention is that adjacent rows, forming an array of beams or beam frames each of which has a width and a height, are forced together or apart by force elements, in a longitudinal direction. At the same time this array does not change size in the lateral dimension. Thus, the array changes length but not width. This is distinguished from the prior art of co-inventor Bobbio in which rigid posts connect adjacent rows of beams and in which both lateral and longitudinal dimensions change with actuation.

Figure 1:
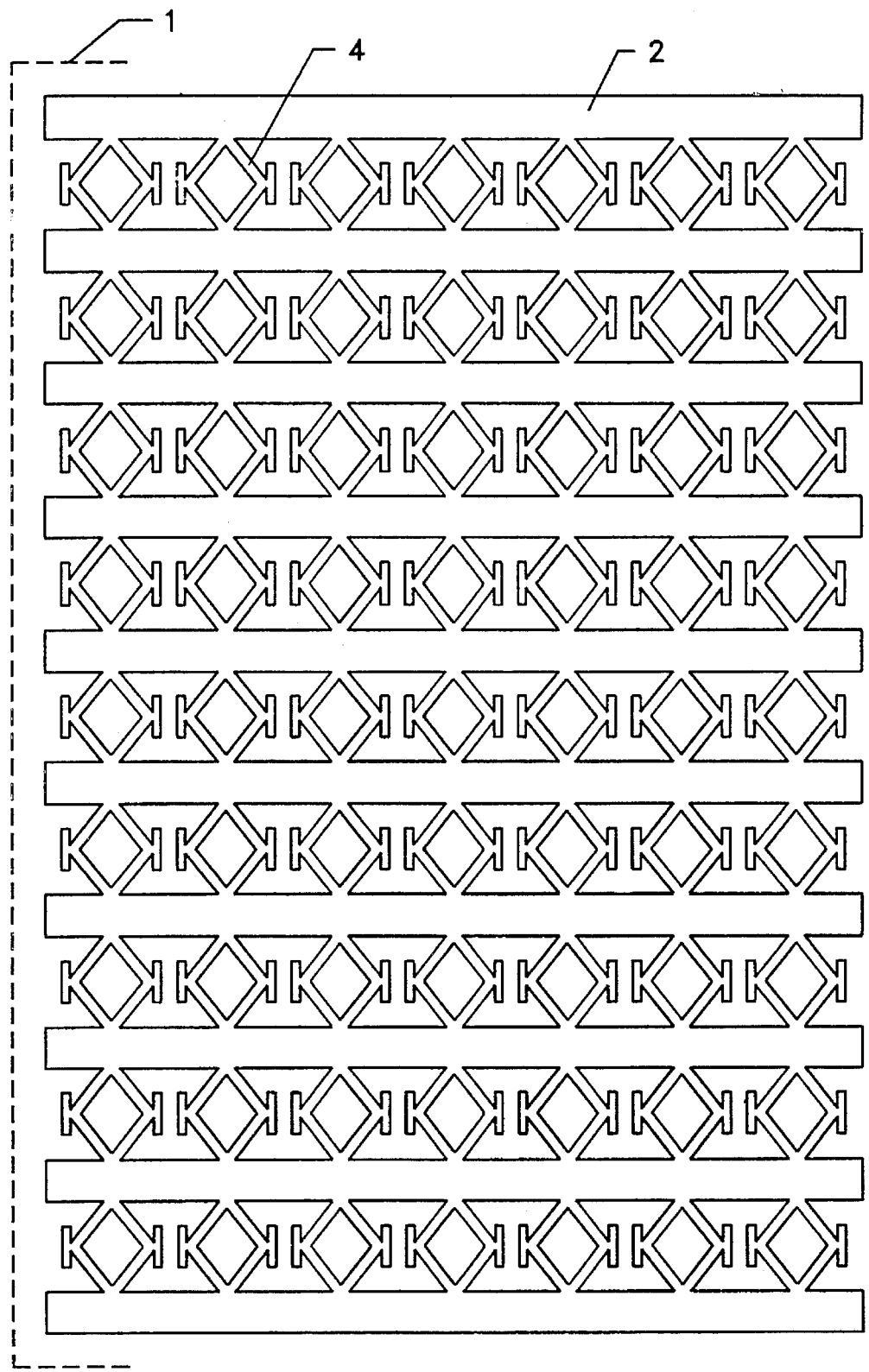
FIG. 1 is a simplified top view of a microactuator array showing diamond spacers for actuation according to the first embodiment of the invention.

FIG. 1 shows a simplified top view of microactuator array 1 showing force elements 4, also called bending spacers, for actuation according to the first embodiment of the invention. Force elements 4 connect adjacent beams 2; by bending, force elements 4 either pull the adjacent beams 2 together or push them apart, causing the entire microactuator array 1 to contract or to expand. Using current manufacturing methods, the thickness of these array elements can be of the order of several microns, and consequently a single layer of microactuator array 1 is a very thin sheet. This thin sheet may be appropriate for micro-applications, but to make a viable 3-d actuator for larger-scale applications, a number of these microactuator array 1 sheets must be either rolled up or stacked. Alternatively, one could take advantage of high aspect ratio manufacturing methods currently under development; these would extend the thickness of a single sheet to tens or even hundreds of microns, thereby reducing the need for rolling or stacking to achieve greater actuator force.

Figure 2:
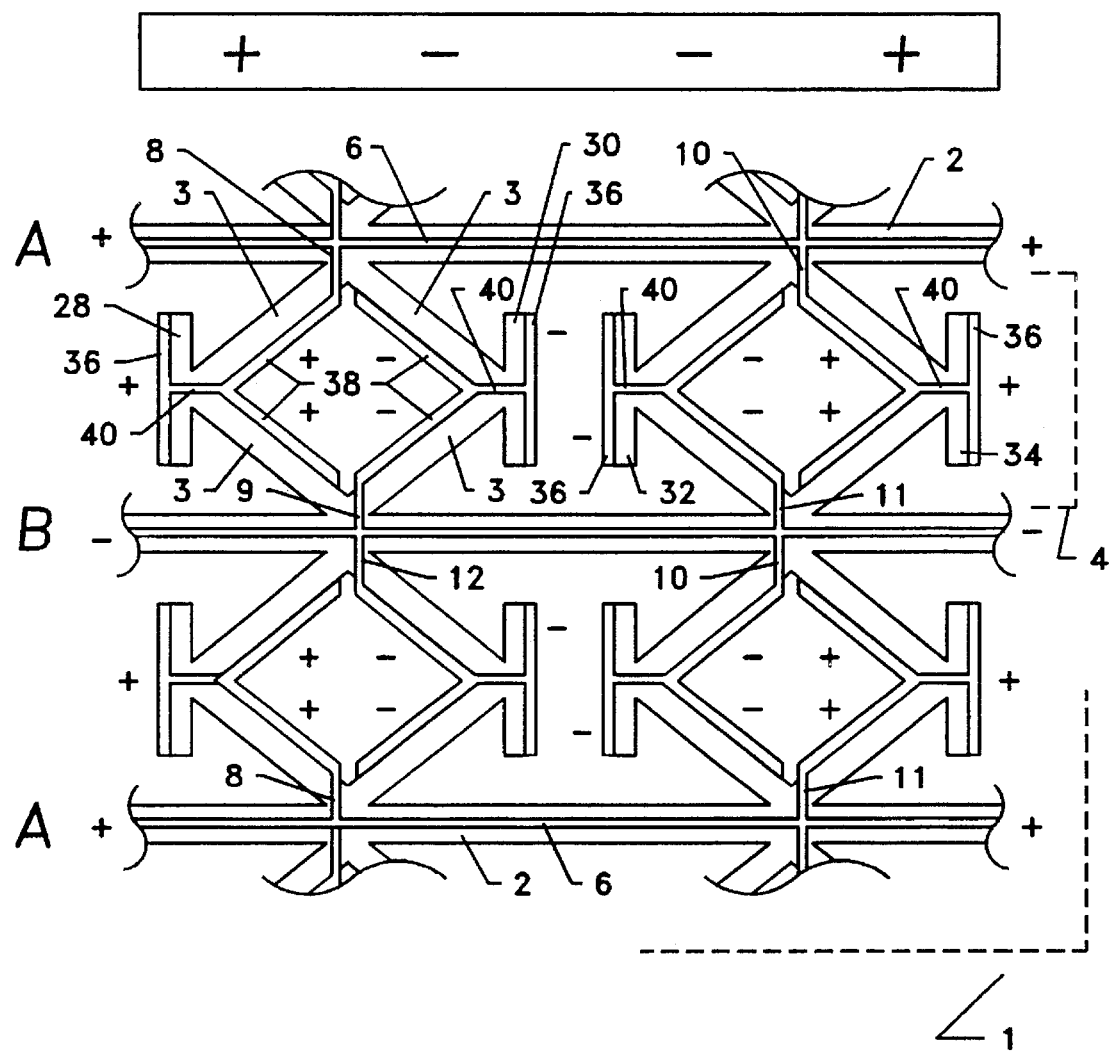
FIG. 2 is a top view of the top side of a microactuator array showing the wiring scheme according to the first embodiment of the invention.
Figure 3:
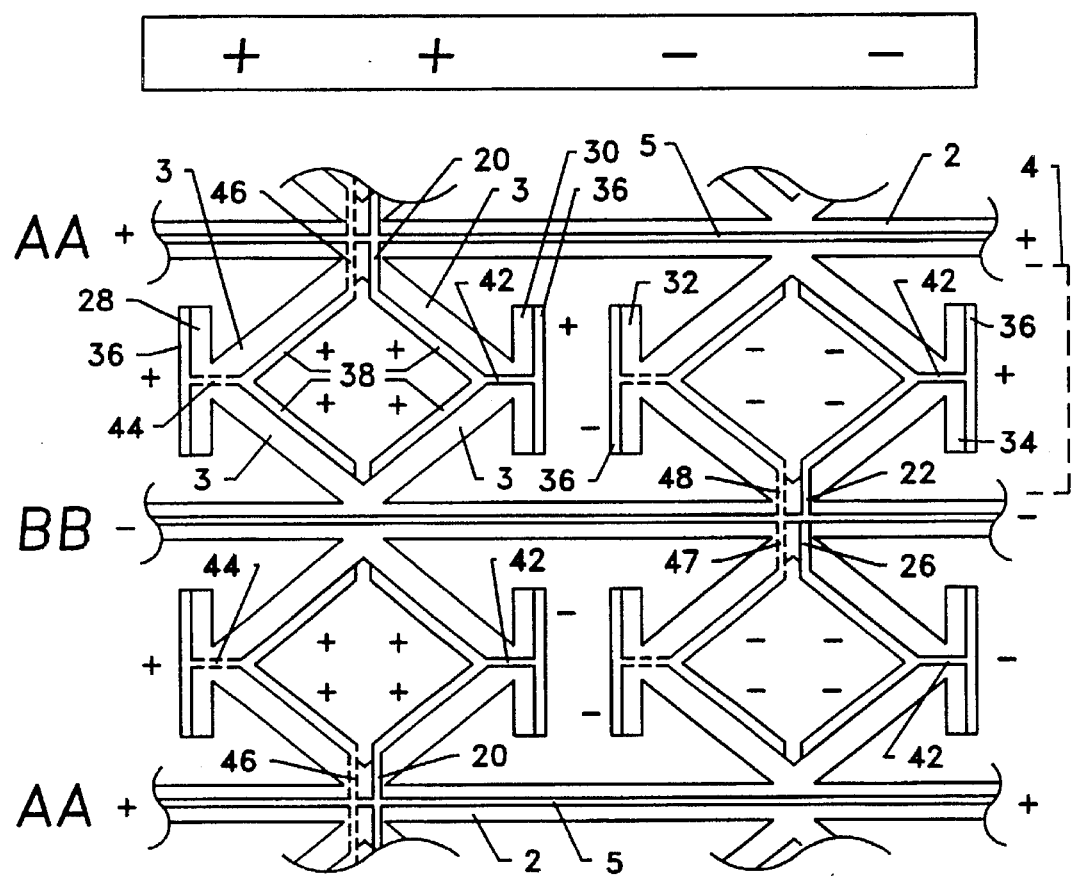
FIG. 3 is a top view of the bottom side of a microactuator array showing the wiring scheme according to the first embodiment of the invention.

FIG. 2 is a top view of the top side of microactuator array 1, and FIG. 3 is a top view of the bottom side of microactuator array 1, both showing the wiring scheme according to the first embodiment of the invention. Each pair of diamond spacers 3 forms a diamond shape, and each diamond spacer 3 is preferably dimensioned to bend primarily at the vertices of this diamond shape. Force elements 4 are comprised of a pair of diamond spacers 3. Each hammer-head forms the center of a diamond spacer 3. For example, first left hammer-head 28 and first right hammer-head 30 form the centers of one force element 4, and second left hammer-head 32 and second right hammer-head 34 form the centers of an adjacent force element 4. Microactuator array 1 is monolithically comprised of beams 2, diamond spacers 3 and hammer-heads 28–34 by virtue of x-y lithographic fabrication. In this fabrication a resilient material such as polyimide is first deposited on a substrate; subsequently, material is removed from this deposition layer to form the monolithic structure. Other steps in the fabrication lay down conductive layers on the top, the bottom, or the sides of the component layer elements.

Figure 4:
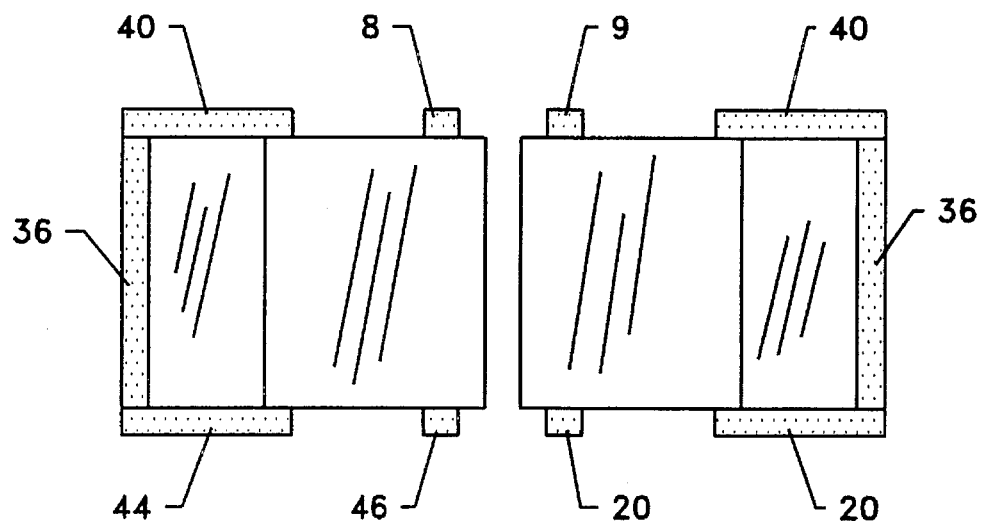
FIG. 4 is a silhouette front view of the diamond spacer elements of the microactuator showing only conductive strips according to the first embodiment of the invention.

Attractive electrostatic force is exerted by conductive metal strips which have been deposited, at an angle, onto sides of the array structure, as indicated in FIG. 4, which is a silhouette front view of force element 4, showing only conductive layers according to the first embodiment of the invention. For example, hammer-head conductive strip 36 is fed by top or bottom connective conductive strips 40 or 42. Feeder line 8 connects one of inner conductive strips 38 to top busline 6, while feeder lines 46 and 20 connect both inner conductive strips 38 to bottom busline 5.

Referring also to FIGS. 2 and 3, inner conductive strips 38 are located on the inner sides of force element 4. When the inner conductive strip 38 on one diamond spacer 3 is connected to a particular voltage, V, and when the other inner conductive strip 38 of the same diamond spacer 3 is connected to an opposite voltage, −V, an attractive force is exerted between these two inner conductive strips 38. This attractive force acts to push apart adjacent beams 2, to expand microactuator array 1.

Hammer-head conductive strips 36 are located on the outer sides of force element 4 for the purpose of exerting maximum contraction forces. For example, when the hammer-head conductive strip 36 on first right hammer-head 30 is connected to a particular voltage, V, and when the hammer-head conductive strip 36 on the second left hammer-head 32 is connected to an opposite voltage, −V, an attractive force is exerted between the hammer-head conductive strip 36 on one force element 4 and the adjacent hammer-head conductive strip 36 on the adjacent force element. This attractive force acts to pull together adjacent beams 2 to contract microactuator array 1. Note that the two closest diamond spacers 3 in two adjacent force elements 4 could be constructed alone or could be considered to be an independent contractive force element.

Figure 5:
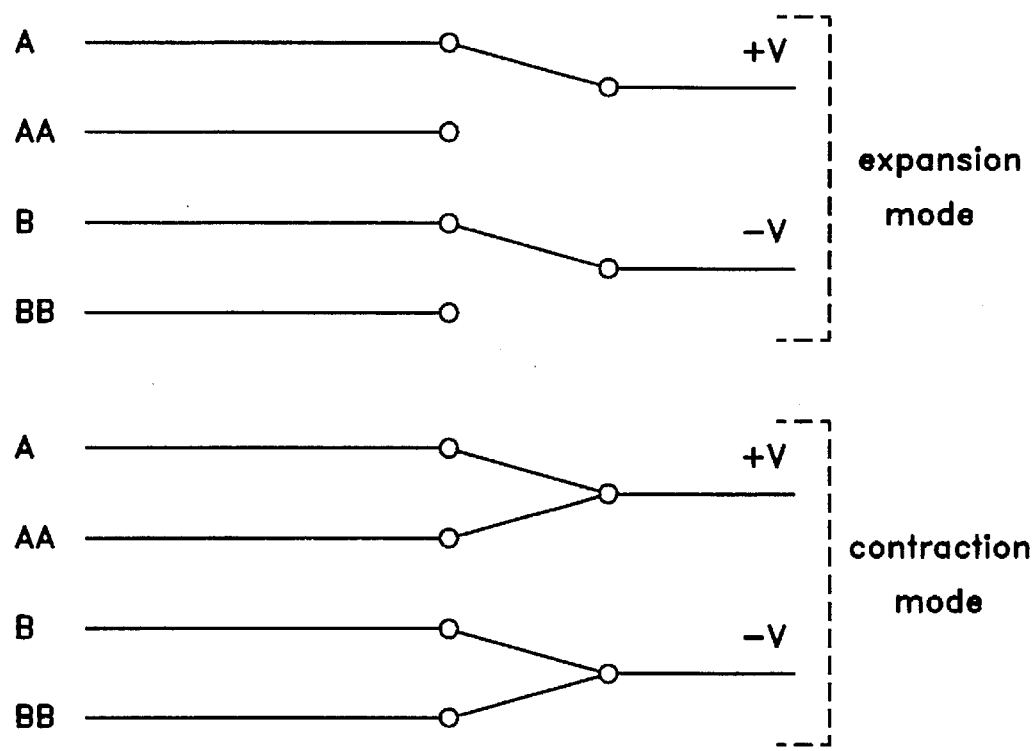
FIG. 5 is a partial schematic of the wiring of the microactuator showing switching configurations for expansion and attraction modes of actuation according to the first embodiment of the invention.

The wiring scheme is depicted in FIGS. 2–4 and in FIG. 5, which is a partial schematic of the wiring of microactuator array 1, showing switching configurations for expansion and attraction modes of actuation according to the first embodiment of the invention. Top busline 6 has been deposited on the top of beams 2, and bottom busline 5 has been deposited on the bottom of beams 2. Also, feeder lines 8, 10, 11, and 12 have been deposited on the top of beams 2 so as to electrically connect top busline 6 with inner conductive strips 38, and feeder lines 46, 20, 22, 26, and 47 have been deposited on the bottom of beams 2 so as to electrically connect bottom busline 5 with inner conductive strips 38. And, top and bottom connective conductive strips 40 and 42 have been deposited on either the top or bottom of hammer-heads 28–34, for the purpose of connecting hammer-head conductive strips 36 to buslines 5 or 6 via inner conductive strips 38. Note that the wiring scheme depicted in FIGS. 2 and 3 is based on pairs of force elements 4, or a left force element 4 and a right force element 4, and the wiring scheme is based on alternating pairs of top buslines 6 labeled A and B or alternating pairs of bottom buslines 5 labeled AA and BB. Finally, microactuator array 1 is comprised of an array of such pairs of elements.

Looking at FIG. 2, top busline 6-A is connected to the left inner conductive strip 38 of the left force element 4 via feeder line 8. Top busline 6-B is connected to the right inner conductive strip 38 of the left force element 4 via feeder line 9. Top busline 6-A is connected to the right inner conductive strip 38 of the right force element 4 via feeder line 10. Top busline 6-B is connected to the left inner conductive strip 38 of the right force element 4 via feeder line 11. Also, top connective strips 40 electrically connect the various hammer-head conductive strips 36 to the their neighbors which are the various inner conductive strips 38.

Looking at FIG. 3, bottom busline 5-AA is connected to the right inner conductive strip 38 of the left force element 4 via feeder line 20. Bottom busline 5-AA is connected to the left inner conductive strip 38 of the left force element 4 via feeder line 46. Bottom busline 5-BB is connected to the right inner conductive strip 38 of the right force element 4 via feeder line 22. Bottom busline 5-BB is connected to the left inner conductive strip 38 of the right force element 4 via feeder line 48. Also, bottom connective strips 42 electrically connect the various hammer-head conductive strips 36 to the their neighbors which are the various inner conductive strips 38.

Careful inspection of FIGS. 2–4 and FIG. 5 reveals that when the various buslines are switched according to the expansion mode, microactuator array 1 expands, and when the various buslines are switched according to the contraction mode, microactuator array 1 contracts. For expansion, the buslines labeled A are connected to +V and the buslines labeled B are connected to −V. For contraction, the buslines labeled AA are connected to +V and the buslines labeled BB are connected to −V.

It should be understood that microactuator array 1 could be designed to function only as an expansion actuator or only as a contraction actuator; in the preferred embodiment it is, however, a bi-directional actuator.

Figure 6:
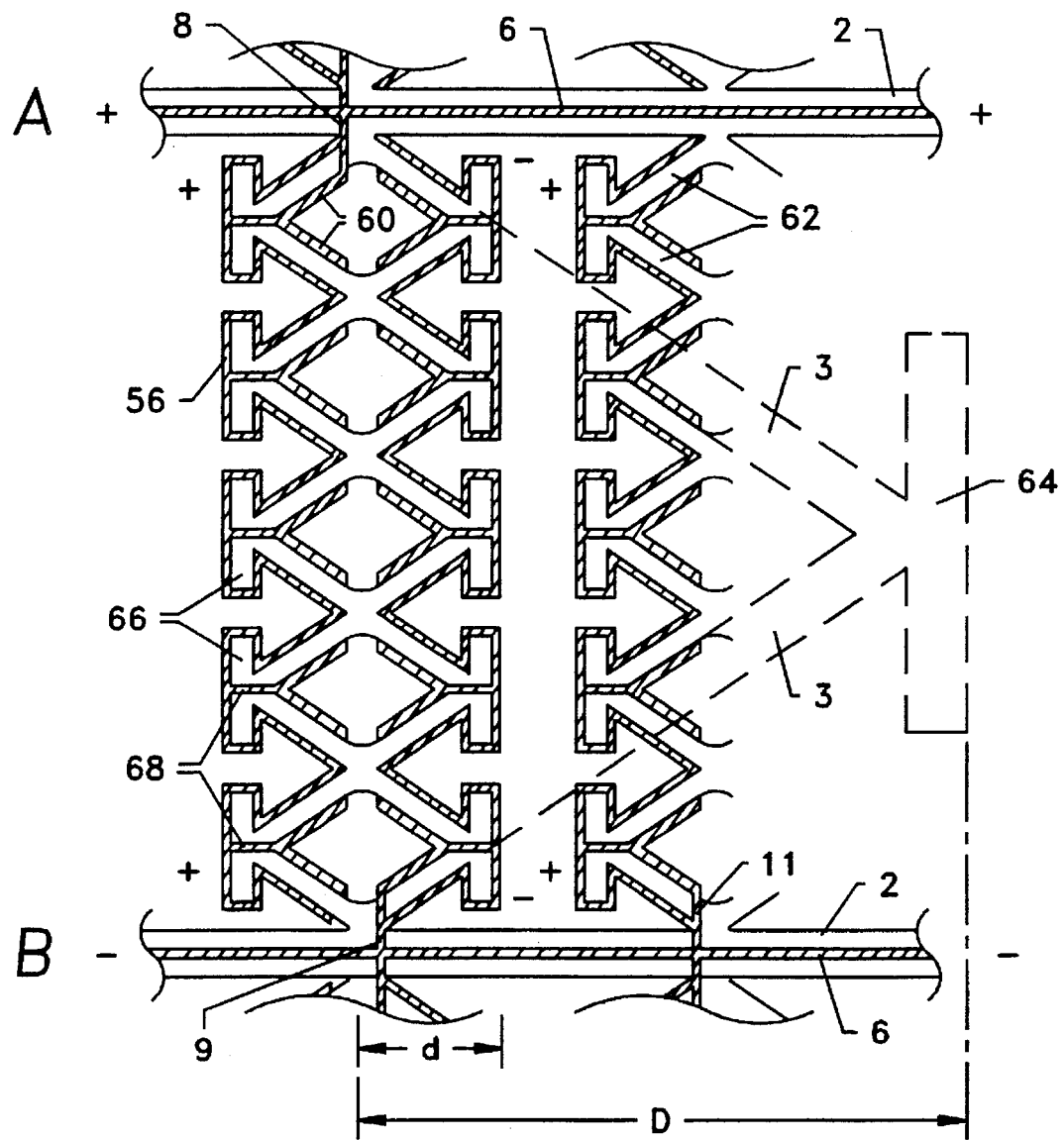
FIG. 6 is a top view of the top side of a multi-diamond variation of the microactuator array showing the wiring scheme according to the second embodiment of the invention.

FIG. 6 is a top view of the top side of a multi-diamond variation of microactuator array 1 showing the wiring scheme according to the second embodiment of the invention. FIG.6 is equivalent to FIG. 2 except that the single diamond spacers 3 of FIG. 2 have been replaced by multiple diamond spacers 62. Outer conductive strips 56 are analogous to hammer-head conductive strips 36, and multiple connective conductive strips 68 are analogous to top or bottom connective conductive feeder lines 40 and 42. The second embodiment allows the attractive elements, namely multiple inner conductive strips 60 and multiple outer conductive strips 56, to lie closer together over the entire range of expansion or contraction than is the case for the first embodiment. That is, multiple inner conductive strips 60 are separated by a characteristic distance range of 0 to 2d, whereas inner conductive strips 38 that would be on the single diamond spacer 64, shown in phantom, would be separated by a characteristic distance range of 0 to 2D. The same is true for the attractive forces between multiple outer conductive strips 58. Since the attractive elements are closer together, the forces are greater and the actuator is stronger.

Figure 7:
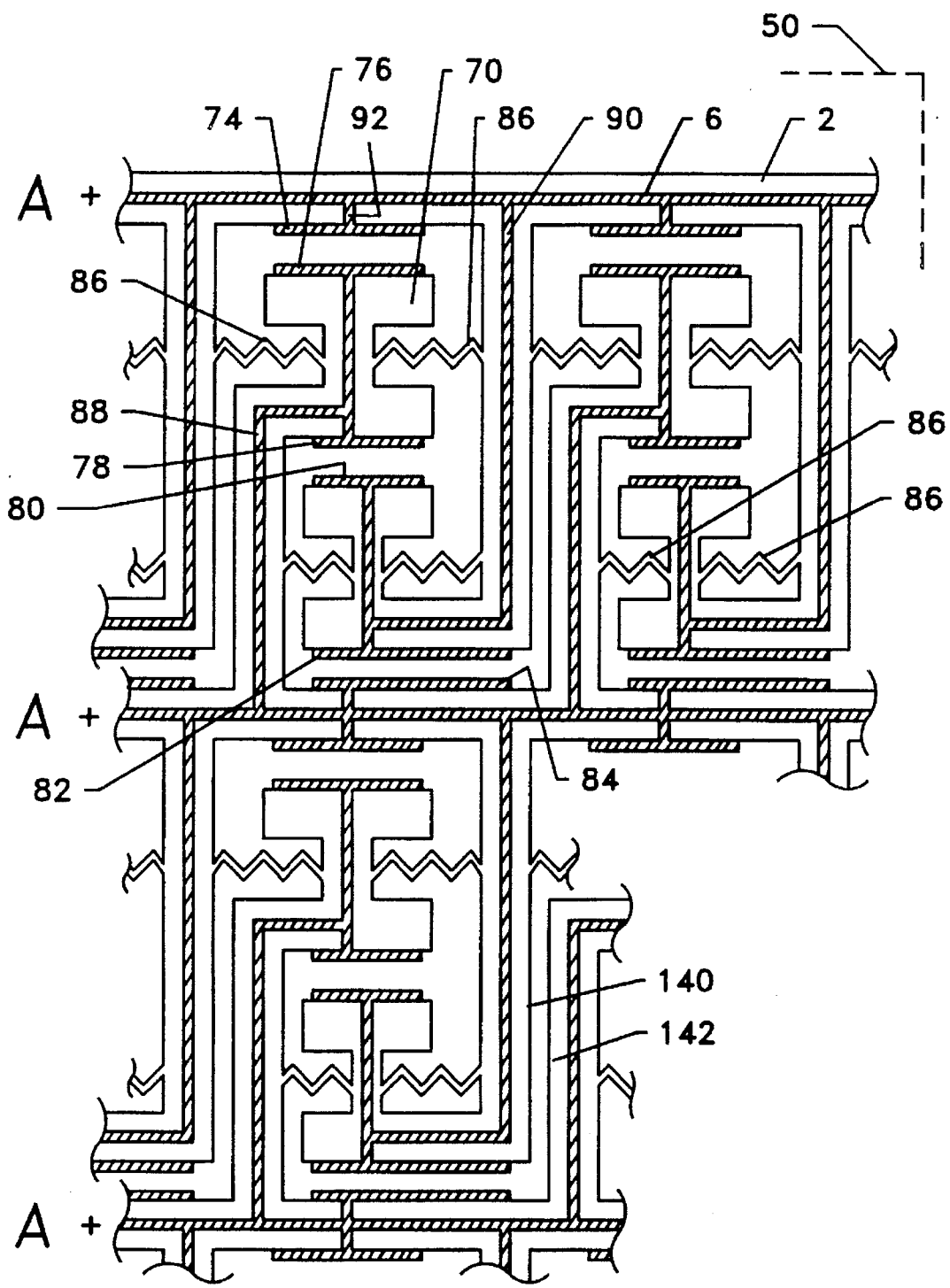
FIG. 7 is a top view of the top side of an interlocking-L microactuator showing the wiring scheme according to the third embodiment of the invention.
Figure 8:
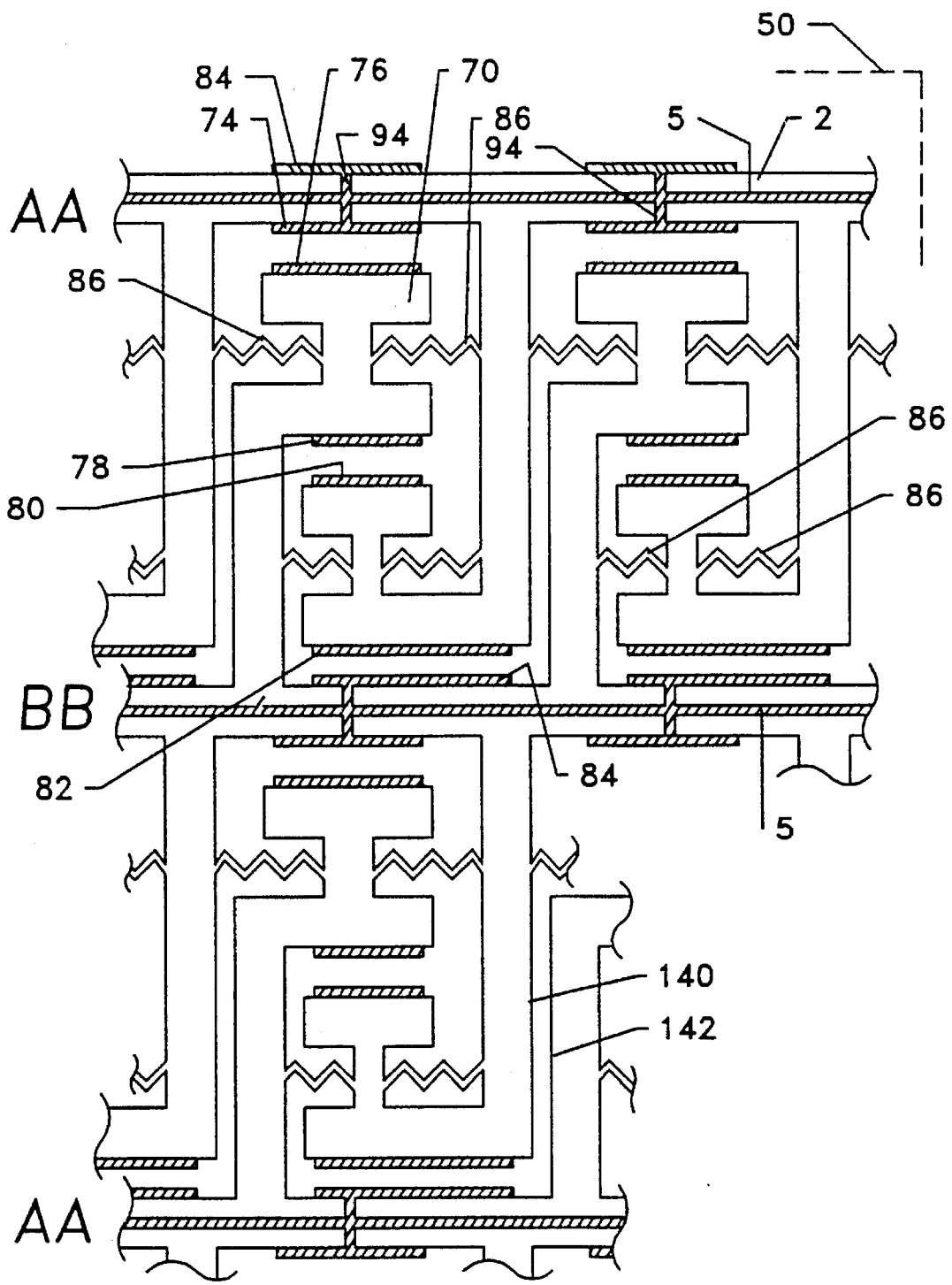
FIG. 8 is a top view of the bottom side of an interlocking-L microactuator showing the wiring scheme according to the third embodiment of the invention.
Figure 9:
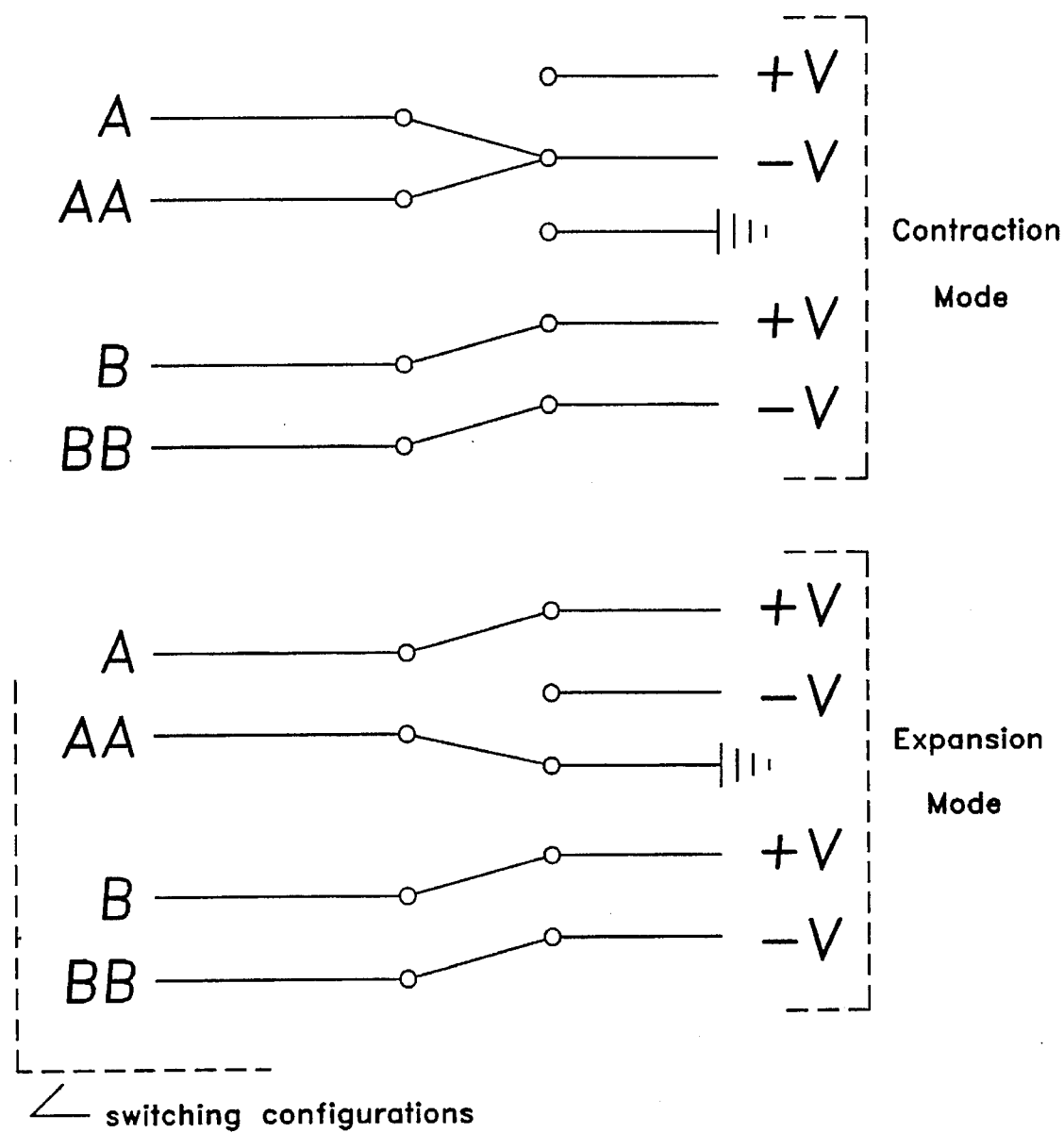
FIG. 9 is a partial schematic of the wiring of the interlocking-L microactuator showing switching configurations for expansion and attraction modes of actuation according to the third embodiment of the invention.

FIG. 7 is a top view of the top side of interlocking-L microactuator array 50 showing the wiring scheme according to the third embodiment of the invention. FIG. 8 is a top view of the bottom side of interlocking-L microactuator array 50, and FIG. 9 is a partial schematic of the wiring of interlocking-L microactuator array 50 showing switching configurations for expansion and attraction modes of actuation. Beams 2, first interlocking-L element 70, second interlocking element 72, and extensible positioners 86 are monolithically formed from a solid layer of x-ray lithographically deposited material such as polyimide. Extensible positioners 86 constrain first and second interlocking-L elements 70 and 72 to the plane of interlocking-L microactuator array 50, while, at the same time, they allow these elements to move longitudinally together and apart.

Careful inspection of FIG. 7 reveals that when the following conductive elements are connected to voltages of opposite polarity the resulting attractive forces cause interlocking-L microactuator array 50 to expand: first-L lower conductive strip 78 and second-L upper conductive strip 80. In contradistinction, when the following two pairs of conductive elements are connected to voltages of opposite polarity the resulting attractive forces cause interlocking-L microactuator array 50 to contract. The first pair is beam lower conductive strip 74 and first-L upper conductive strip 76; the second pair is second-L lower conductive strip 82 and beam upper conductive strip 84.

To achieve these expansion and contraction modes, the following wiring details are made. Looking at FIG. 7, beam lower conductive strip 74 and beam upper conductive strip 84 are electrically connected to bottom busline 5-AA via bottom feeder line 94; first-L upper and lower conductive strips 76 and 78 are electrically connected to top busline 6-B via first-L top feeder line 88; and second-L upper and lower conductive strips 80 and 82 are electrically connected to top busline 6-A via second-L top feeder line 90.

FIG. 9 shows the wiring connections between the various buslines and external voltages, ±V, to achieve the expansion and contraction modes indicated above. It should be understood that, as with the first embodiment, the various connective conductive strips or feeder lines have been deposited on the top or bottom sides of the various elements of interlocking-L microactuator array 50, and the various conductive strips used for electrostatic attraction have been deposited at an angle on the sides of these various elements.

Figure 10:
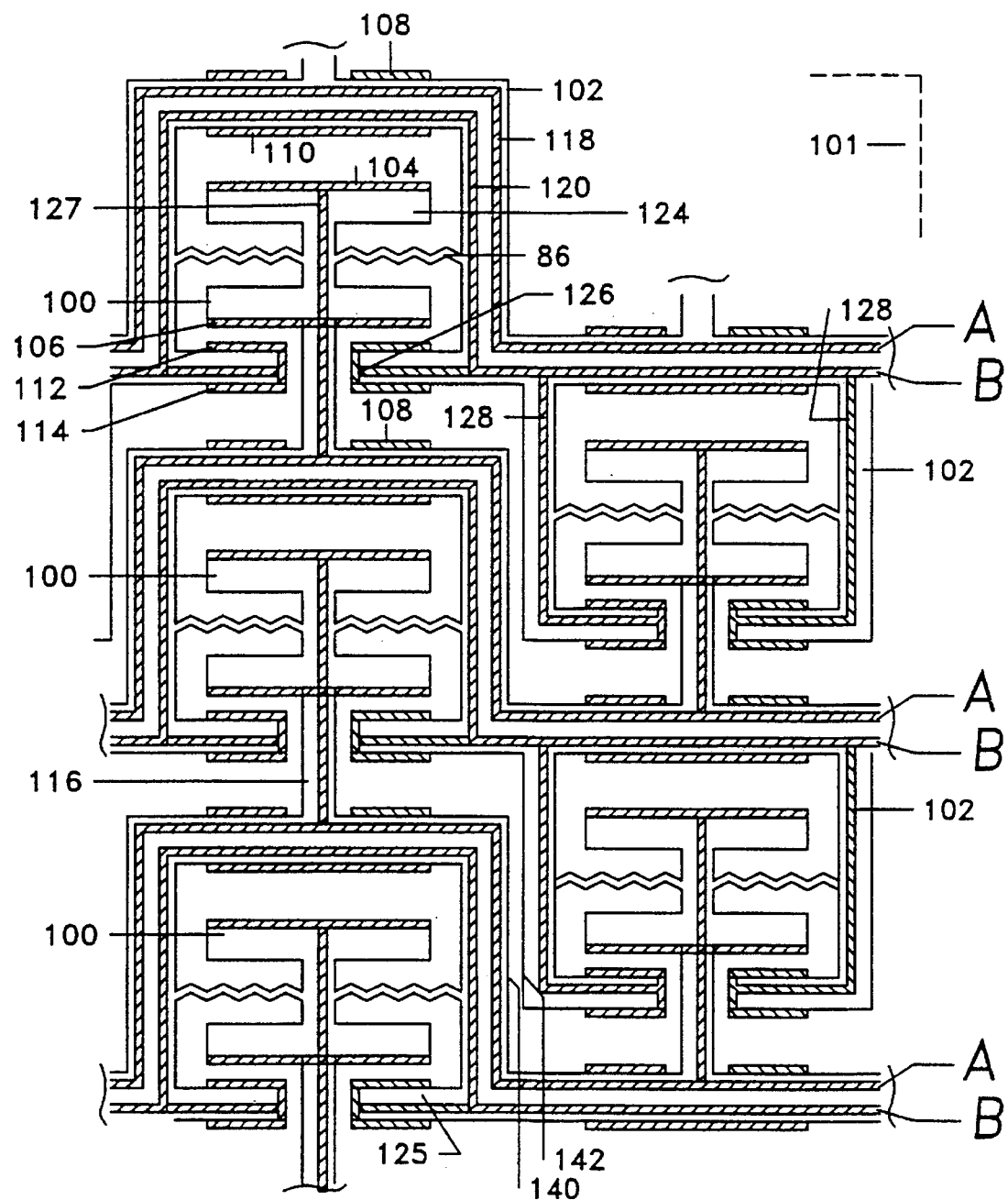
FIG. 10 is a top view of the top side of the staggered interlocking-T microactuator showing the wiring scheme according to the fourth embodiment of the invention.
Figure 11:
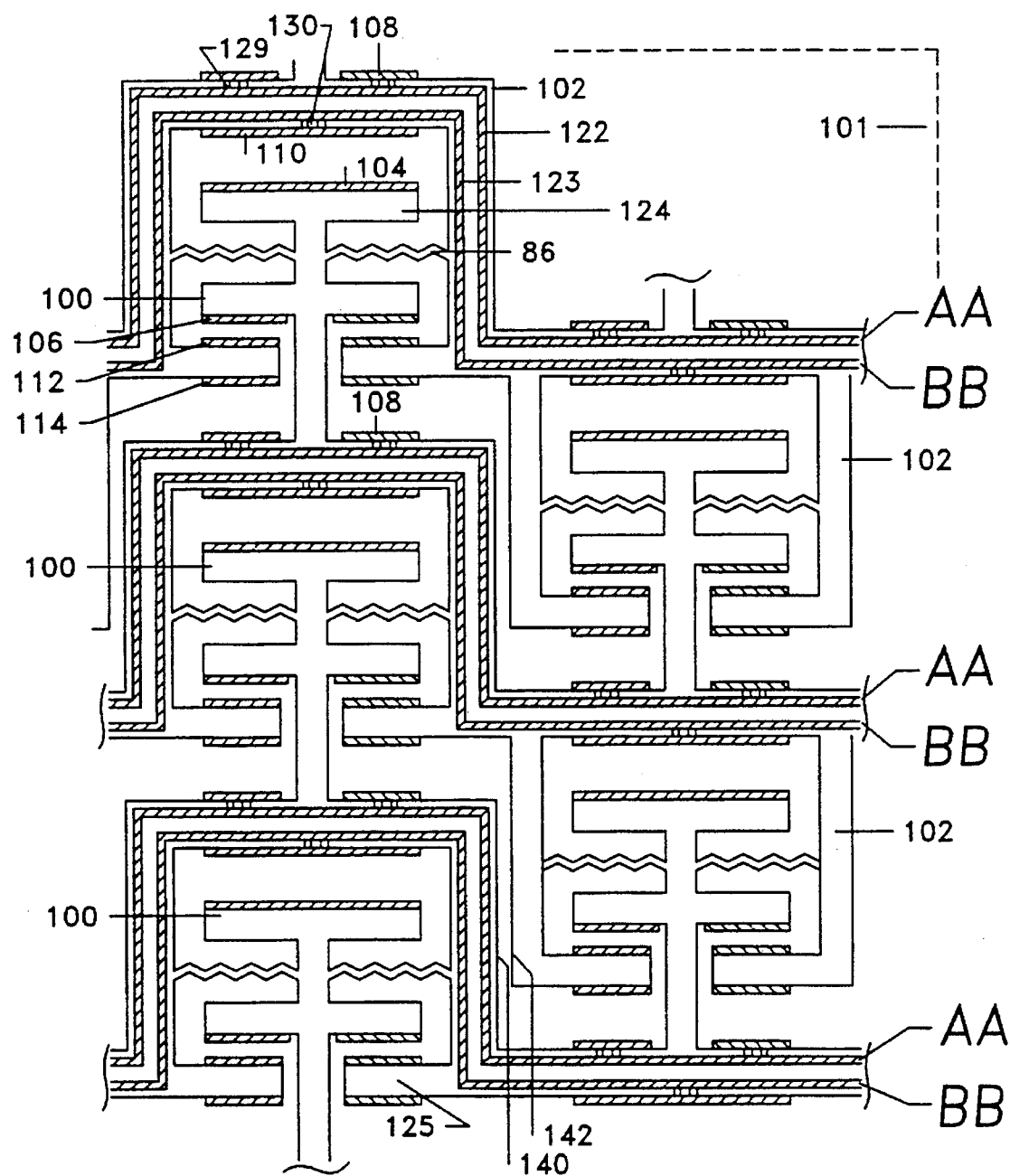
FIG. 11 is a top view of the bottom side of the staggered interlocking-T microactuator showing the wiring scheme according to the fourth embodiment of the invention.
Figure 12:
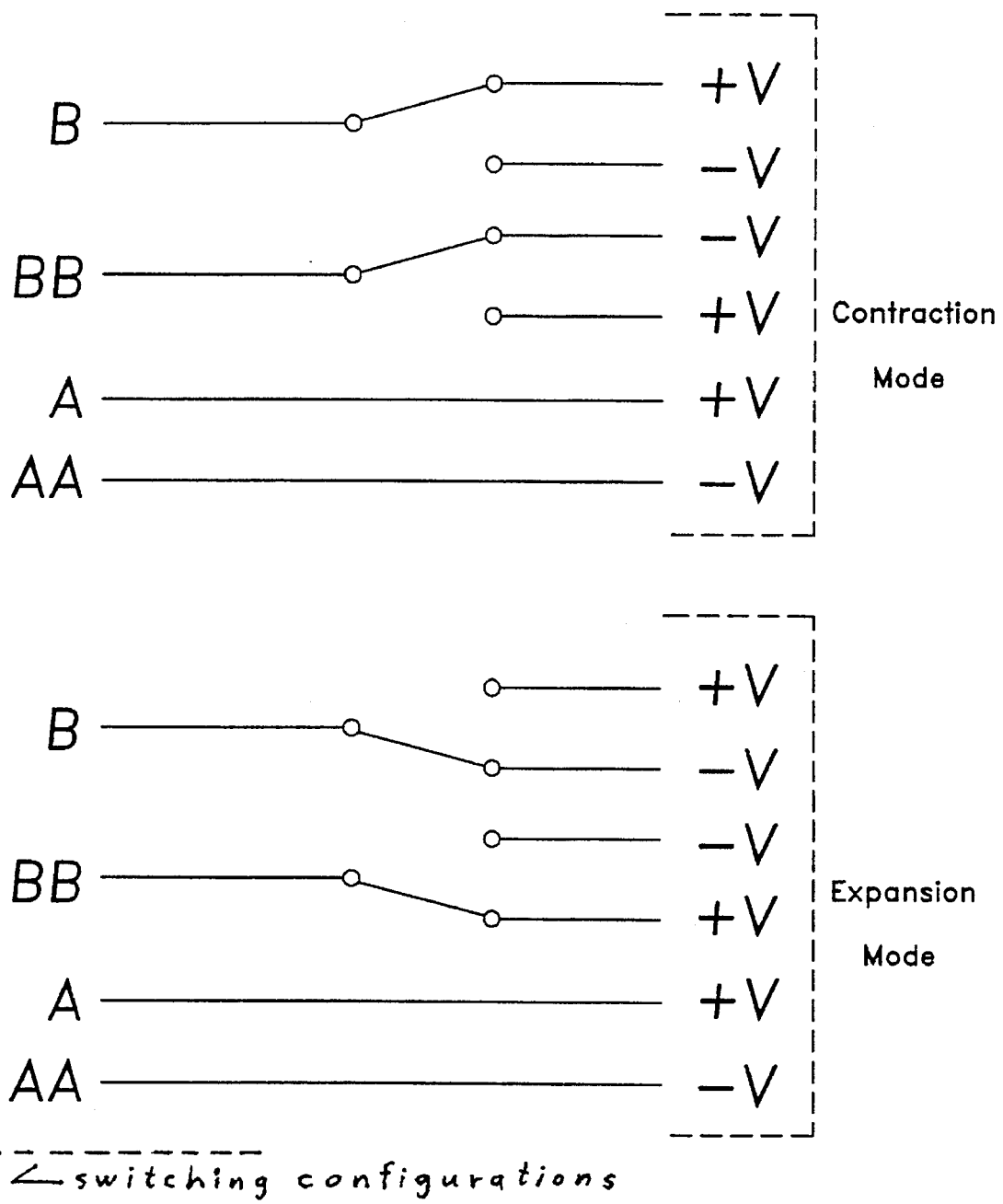
FIG. 12 is a partial schematic of the wiring of the interlocking-T microactuator showing switching configurations for expansion and attraction modes of actuation according to the fourth embodiment of the invention.

The fourth embodiment is similar to the third embodiment with interlocking L-shaped members, except that a T-shaped member interlocks within an inverted U-shaped member, to achieve attractive forces. FIG. 10 is a top view of the top side of staggered interlocking-T microactuator array 101 showing the wiring scheme according to the fourth embodiment of the invention. FIG. 11 is a top view of the bottom side of staggered interlocking-T microactuator array 101 and FIG. 12 is a partial schematic of the wiring of staggered interlocking-T microactuator array 101 showing switching configurations for expansion and attraction modes of actuation. T-frame 100, inverted-U frame 102, and extensible positioners 86 are monolithically formed from a solid layer of x-ray lithographically deposited material such as polyimide. Extensible positioners 86 constrain T-frame 100 and inverted U-frame 102 to the plane of interlocking-T microactuator array 101, while, at the same time, they allow these elements to move longitudinally together and apart. Note that the adjacent array elements comprising T-frame 100, inverted-U frame 102, and extensible positioners 86 are staggered with respect to each other. This makes T-stem 116 less likely to break. T-stem 116 interlocks with inverted U-frame bottom section 125.

Careful inspection of FIG. 10 reveals that when the following conductive elements are connected to voltages of opposite polarity the resulting attractive forces cause interlocking-T microactuator array 101 to expand: T lower conductive strip 106 and lower T-beam upper conductive strip 112. In contradistinction, when the following two pairs of conductive elements are connected to voltages of opposite polarity the resulting attractive forces cause interlocking-T microactuator array 101 to contract. The first pair is upper T-beam lower conductive strip 110 and T upper conductive strip 104; the second pair is lower T-beam lower conductive strip 114 and upper T-beam upper conductive strip 108.

To achieve these expansion and contraction modes, the following wiring details are made. Looking at FIG. 10, T upper and T lower conductive strips 104 and 106 are electrically connected to first top busline 118-A via second top feeder line 127; and lower T-beam upper and lower conductive strips 112 and 114 are electrically connected to top busline 120-B via first T-top feeder line 126 and via third top feeder line 128. Looking at FIG. 11, upper T-beam lower conductive strip 110 is electrically connected to second bottom busline 123-BB via second bottom feeder line 130; and upper T-beam upper conductive strip 108 is electrically connected to first bottom busline 122-AA via first bottom feeder line 129.

FIG. 12 shows the wiring connections between the various buslines and external voltages, ±V, to achieve the expansion and contraction modes indicated above. It should be understood that, as with the first embodiment, the various connective conductive strips or feeder lines have been deposited on the top or bottom sides of the various elements of interlocking-T microactuator array 101, and the various conductive strips used for electrostatic attraction have been deposited at an angle on the sides of these various elements.

Figure 13:
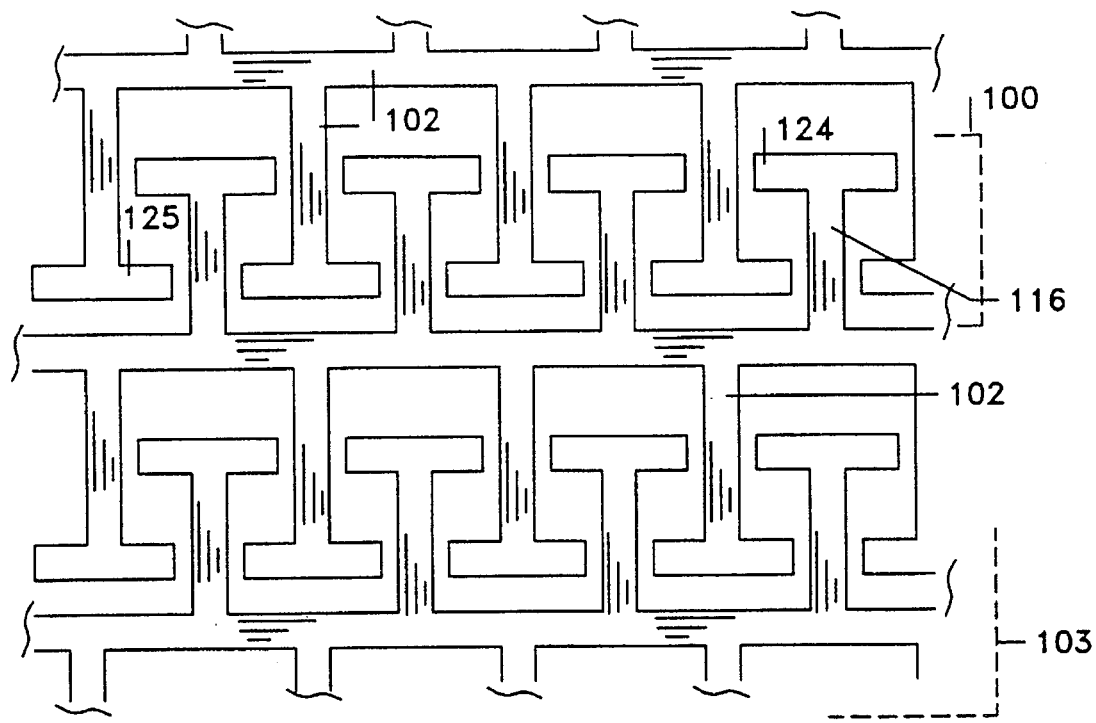
FIG. 13 is a simplified top view of a non-staggered interlocking-T microactuator according to the fifth embodiment of the invention.

FIG. 13 is a simplified top view of non-staggered interlocking-T microactuator array 103 according to the fifth embodiment of the invention. It shows a given array element comprising T-frame 100, T-top 124, and inverted U-frame bottom section 125 which is not staggered with respect to its adjacent array element.

It should be understood that the three primary embodiments, namely those of FIGS. 2–5, of FIGS. 7–9, and of FIGS. 10–12, can be wired to actuate "one-way" with buslines only on the top of the array. For example, each embodiment could only expand, or only contract, with the top-only wiring. This alternative wiring, which is easier to implement, would, however, require conductive strips along the tops of extensible positioners 86 for the second and third of these primary embodiments.

Figure 14:
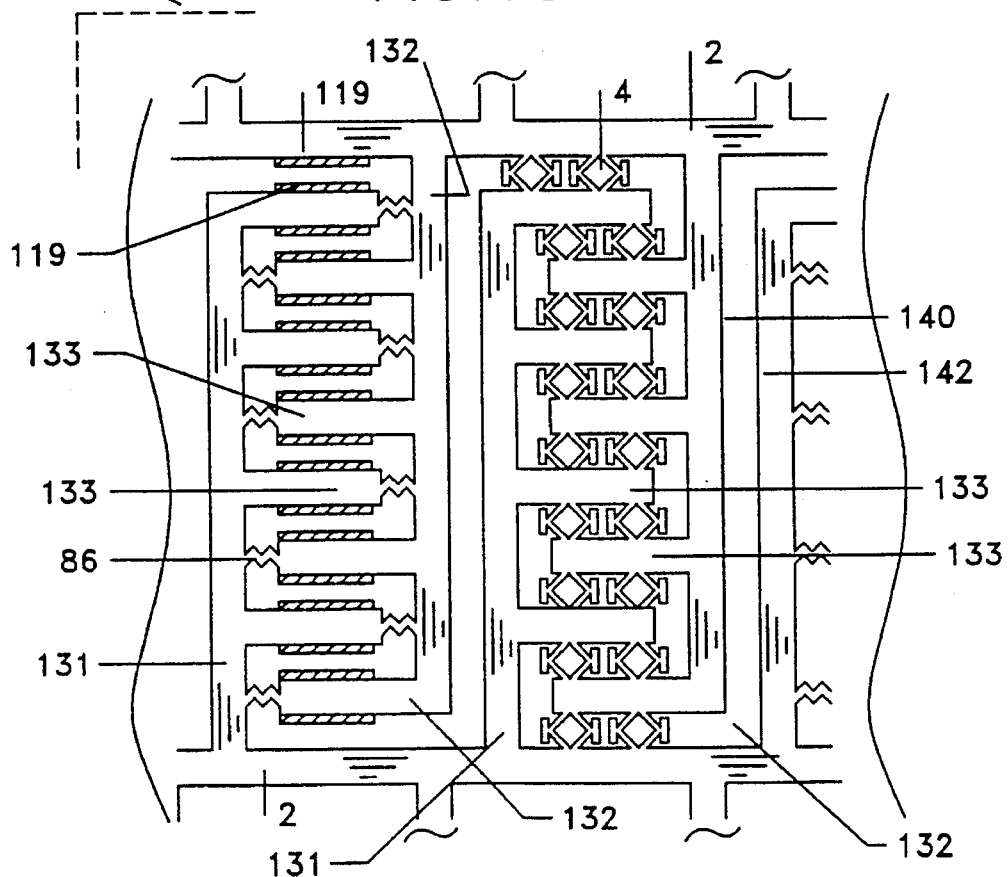
FIG. 14 is a simplified top view of the an L-tree microactuator according to the sixth embodiment of the invention.

FIG. 14 is a simplified top view of the L-tree microactuator array 135 according to the sixth embodiment of the invention. It is similar to the third embodiment of FIGS. 7–9 in terms of the type of interlocking of L-shaped elements and in terms of the wiring scheme; the difference is that each interlocking element is now a tree with multiple branches. That is, lower L-tree 131 comprising multiple L-tree branches 133 interlocks with upper L-tree 132 also comprising multiple L-tree branches 133. Attractive forces between adjacent conductive strips 119 cause contraction or expansion.

An alternative configuration is shown on the right side of FIG. 14 where force elements 4 interconnect multiple L-tree branches 133 and either push them apart for expansion or pull them together for contraction. An additional feature utilizes first guide 140 and second guide 142 to prevent lower L-tree 131 and upper L-tree 132 from tilting and binding with respect to each other. Note that the force exerted by L-tree microactuator array 135 is roughly increased by a factor equal to the number of branches, while the displacement is decreased by the same factor.

Figure 15:
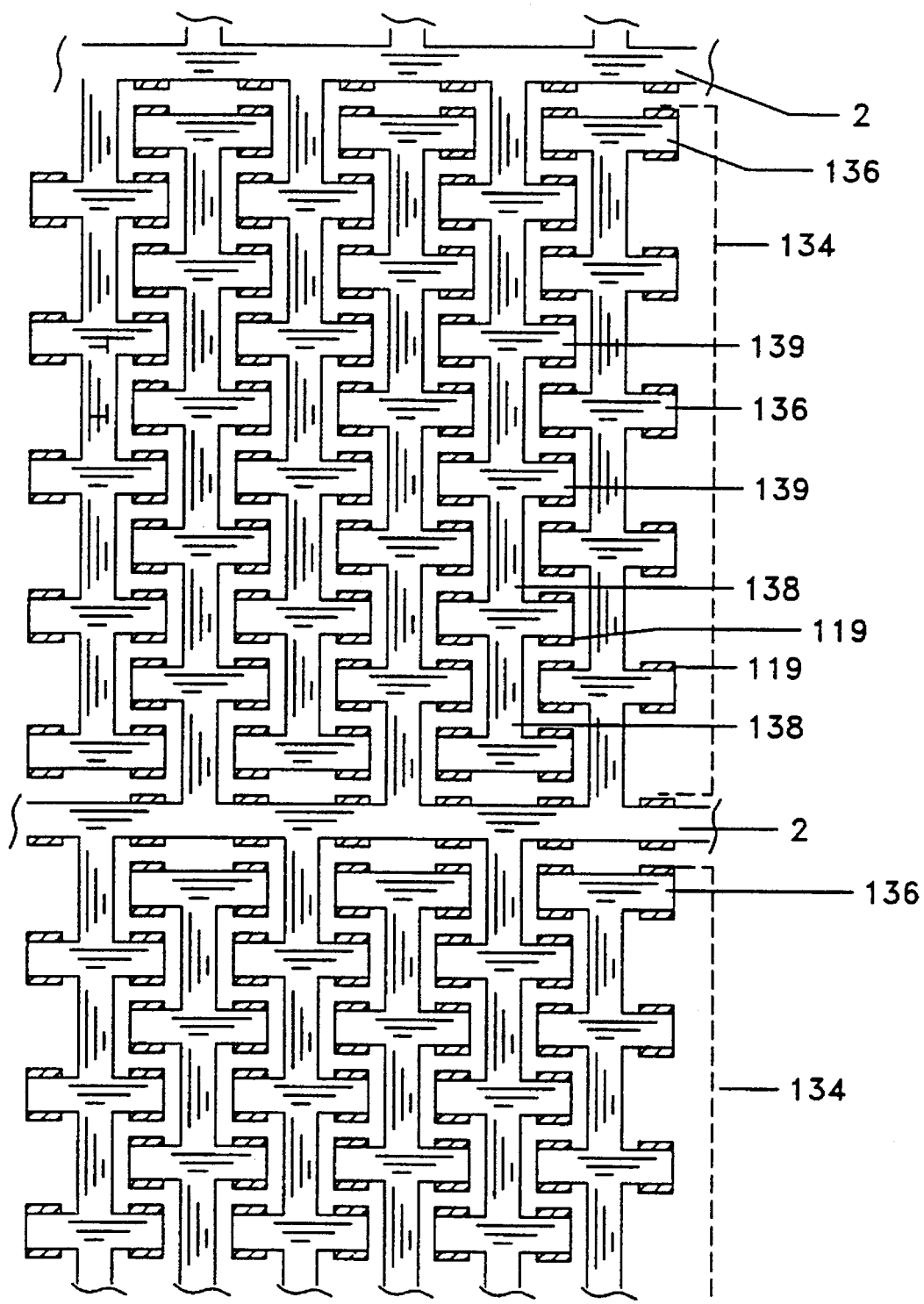
FIG. 15 is a simplified top view of the a T-tree microactuator according to the seventh embodiment of the invention.

FIG. 15 is a simplified top view of T-tree microactuator array 137 according to the seventh embodiment of the invention. It is similar to the fourth embodiment of FIGS. 10–12 in terms of the type of interlocking of T-shaped elements and in terms of the wiring scheme; the difference is that each interlocking element is now a tree with multiple branches. That is, T-tree 134, comprising T-tree branches 136, interlocks with T-tree frame branches 139, which extend from T-tree frame 138. Attractive forces between adjacent conductive strips 119 cause contraction or expansion.

It should be understood that force elements 4 could be used to interconnect multiple T-tree branches 136 and T-tree frame branches 139, as was portrayed in FIG. 14. Note again that the force exert by T-tree microactuator array 137 is roughly increased by a factor equal to the number of branches, while the displacement is decreased by the same factor.

Figure 16:
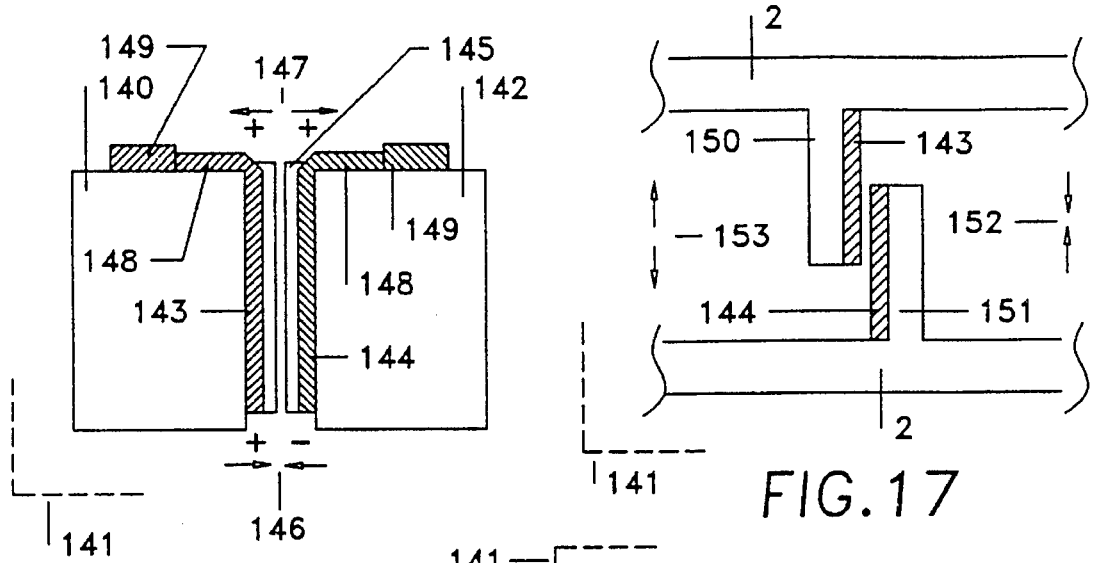
FIG. 16 is a front view of an electrostatic-locking feature according to the eighth embodiment of the invention.

FIG. 16 is a front view of electrostatic-locking means 141 according to the eighth embodiment of the invention, and an example from previous embodiments is indicated in FIG. 14. First guide 140 and second guide 142 may be parallel strips of a generic microactuator array. First guide conductive strip 143 and second guide conductive strip 144 have been deposited on the sides facing each other of first guide 140 and second guide 142, respectively. Insulating films 145 have been deposited over first and second guide conductive strips 143 and 144 for electrical insulation in case these should touch. Guide connective conductive strips 148 connect first and second guide conductive strips 143 and 144, with both of these being located on the top side (or bottom side) of electrostatic locking means 141. Arrows 146 show the direction of the attractive electrostatic force when first guide conductive strip 143 is connected to a voltage opposite in polarity to that connected to second guide conductive strip 144. At this time first and second guides 140 and 142 are pulled to bind together, thereby locking a generic microactuator array at a fixed position of length change, irrespective of an external load. Arrows 147 show the direction of the repulsive electrostatic force when first guide conductive strip 143 is connected to a charge source of the same polarity as that connected to second guide conductive strip 144. At this time first and second guides 140 and 142 repel each other, thereby acting as a frictionless bearing which allows generic microactuator array to freely change its length according to external load.

Figure 17:
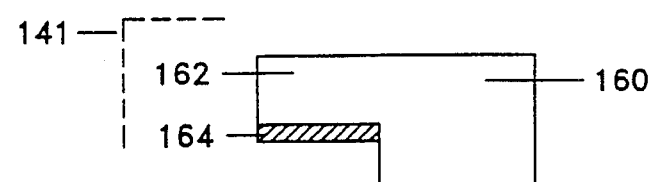
FIG. 17 is a top view of an electrostatic-locking feature according to the eighth embodiment of the invention.

FIG. 17 is a top view of an application of electrostatic-locking means 141 according to the eighth embodiment of the invention. First finger guide 150 extends downward from a beam 2, while second finger guide 151 extends upward from the lower adjacent beam 2, parallel to and overlapping with first finger guide 150. Again, the inward sides have been deposited with first and second guide conductive strips 143 and 144. And again, when the beams 2 of a generic microactuator array move either together or apart as shown by arrows 146 or 147, respectively, first and second finger guides 150 and 151 can be caused to act as a lock or as a bearing for this motion.

Figure 18:
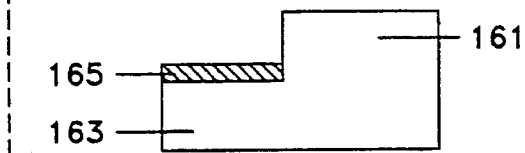
FIG. 18 is a front view of an application of an electrostatic-locking feature according to the eighth embodiment of the invention.

FIGS. 16 and 17 for the eighth embodiment feature conductive strips on the sides of the guide elements. It is also possible to achieve locking by use of offset guide members which have conductive strips on their bottom or top sides. FIG. 18 is a front view of an electrostatic-locking means 141 comprising upper layer guide 162 which is adjacent to and integrally part of first frame finger 160. These move along lower layer guide 163 which is adjacent to and integrally part of second frame finger 161. Upper and lower conductive strips 164 and 165 provide the electrostatic locking.

Figure 19:
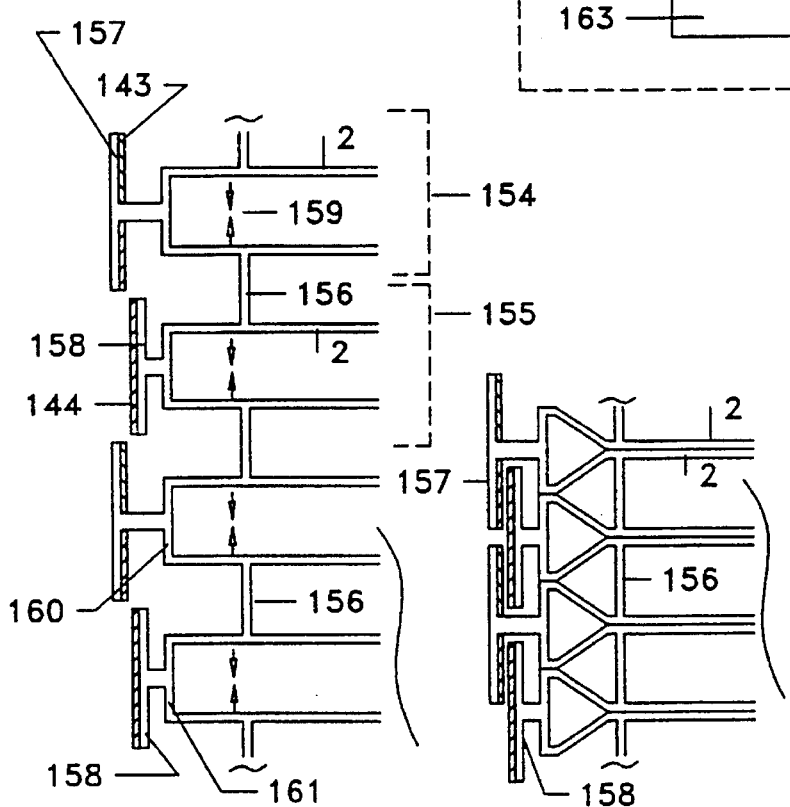
FIG. 19 is a top view of an application of an electrostatic-locking feature according to the eighth embodiment of the invention.

FIG. 19 is a top view of an application of electrostatic-locking means 141 according to the eighth embodiment of the invention. It is similar to the example of FIG. 17 except that it would be located at the end of a row or subsection of microactuator array 1. First frame 154 is comprised of a pair of beams 2, and second frame 155 is comprised of an adjacent pair of beams 2; first and second frames 154 and 155 are rigidly connected by posts 156. The pair of beams 2 comprising first frame 154 are connected at their ends by first frame end post 160; the pair of beams comprising second frame 155 are connected at their ends by second frame end post 161. First end guide 157 is rigidly attached to first frame end post 160, while second end guide 158 is rigidly attached to second end post 161, in such a manner as to run parallel and to overlap with first end guide 158. As with the embodiment of FIG. 16, first guide conductive strip 143, on the inside of first end guide 157, and second guide conductive strip on the inside of second end guide 158, make possible a lock or a bearing for the contractive or expansive motion of a generic microactuator array; this actuator motion is indicated by arrows 159.

Figure 20:
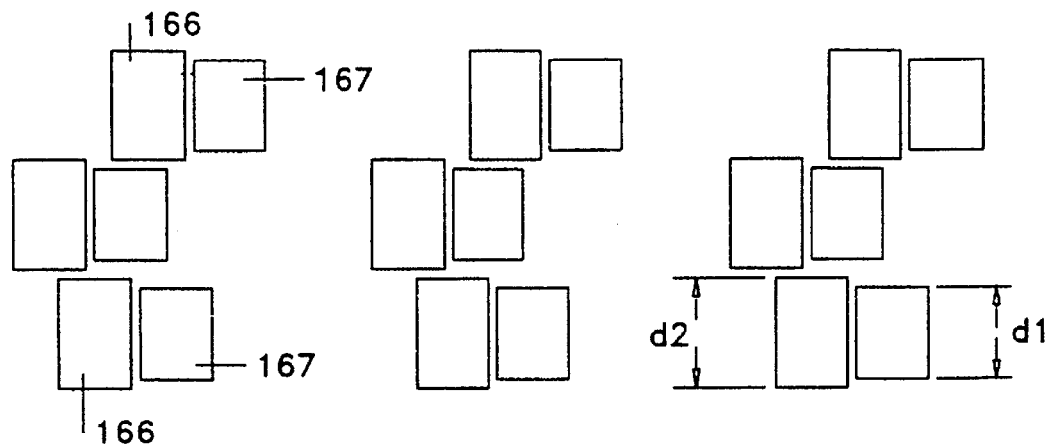
FIG. 20 is a simplified front view of three layers of a microactuator showing vertical offsets for adjacent array elements according to the ninth embodiment of the invention.

FIG. 20 is a simplified front view of three stacked layers of a generic microactuator array 1 showing vertical offsets for adjacent array elements according to the ninth embodiment of the invention. Beam element 166, such as beam 2 from FIG. 1, has a greater thickness, d2, than thickness, d2, of adjacent beam element 167 ( in the same layer), which moves relative to beam element 166. This difference in thickness ensures that any adjacent beam elements 167 int one layer will not bind on components of other beam elements 166 or adjacent beam elements 167 in the stacked layers above or below.

Figure 21:
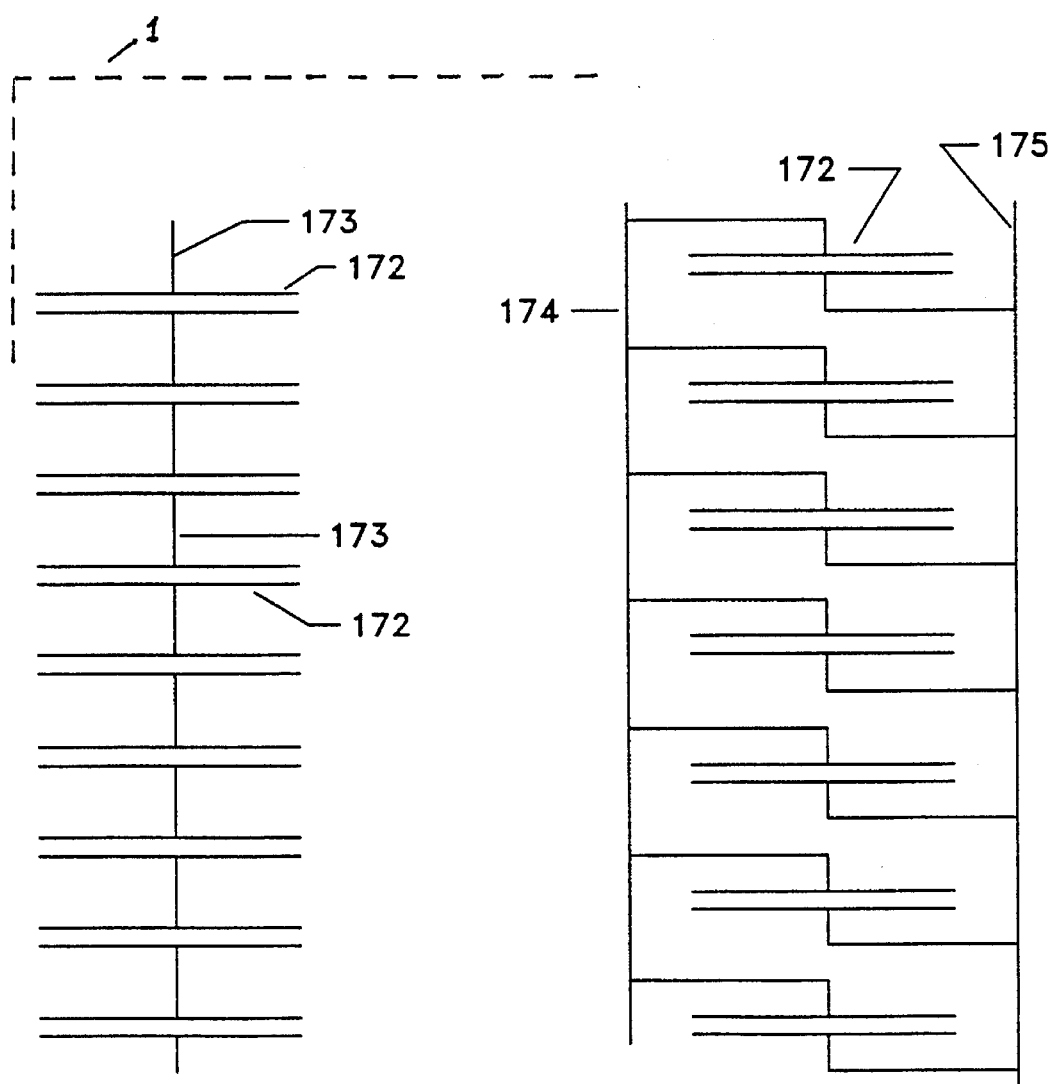
FIG. 21 is a schematic representation of two wiring schemes for use of the microactuator as a displacement sensor according to the tenth embodiment of the invention.

FIG. 21 is a schematic representation of two wiring schemes for use of microactuator array 1 as a displacement sensor according to the tenth embodiment of the invention. Capacitive elements 172 might be any pair of adjacent conductive strips connected to voltages of opposite polarity, such as inner conductive strips 38 or hammer-head conductive strips 36 of FIG. 2. If these are interconnected as shown on the left side of FIG. 21 and probed by a capacitance meter via series leads 173, the inverse of the measured total capacitance is the sum of the inverses of the individual component capacitances. Since each individual component capacitance is approximately proportional to the inverse of the distance between each pair of conductive strips forming a capacitive element, the total measured capacitance is proportional to the inverse of the total distance between individual elements of microactuator array 1.

If the total capacitance is probed in parallel as shown in the right side of FIG. 21, via first parallel busline 174 and second parallel busline 175, the total measured capacitance is proportional to the sum of the reciprocals of distances between individual elements of microactuator array 1. If these individual distances are fairly constant over the measured length of microactuator 1, this total measured capacitance can give a good estimate of the length of microactuator array 1.

Figure 22:
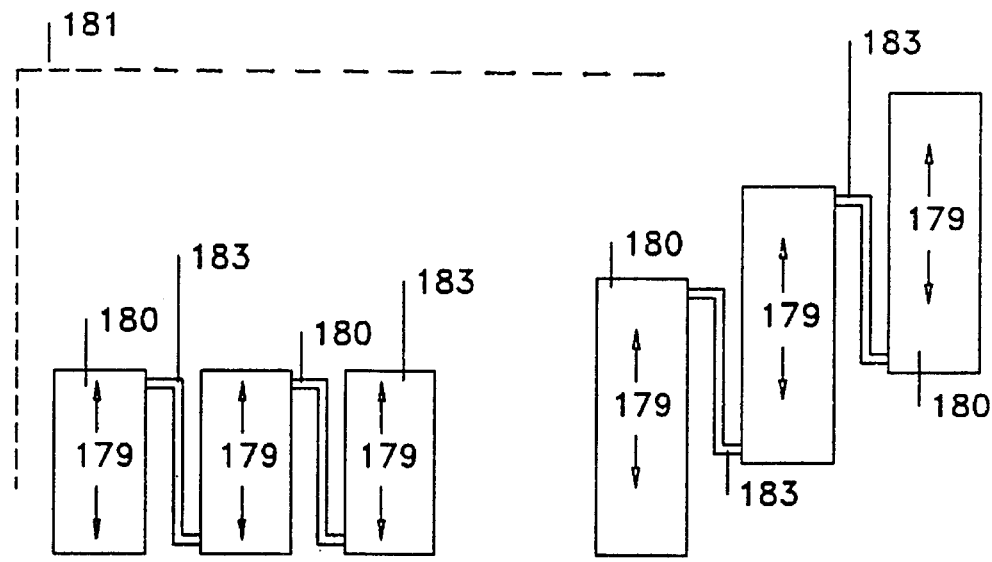
FIG. 22 is a schematic representation of a first design for telescoping microactuators according to the eleventh embodiment of the invention.

FIG. 22 is a schematic representation of a first design for telescoping microactuator arrays 181 according to the eleventh embodiment of the invention. The purpose of this embodiment is to amplify actuator displacement which may be a consideration in applications where the original length of an actuator is constrained to a small value. Beginning at the left side of telescoping microactuator array 181, each successive expansive element 180 is rigidly attached from its bottom end to the top end of the previous expansive element 180 by first telescopic connector 183. As shown on the right side of FIG. 22, when each expansive element 180 expands according to arrows 179 the displacement of the rightmost expansive element 180 is N times the displacement of a single expansive element 180.

Figure 23:
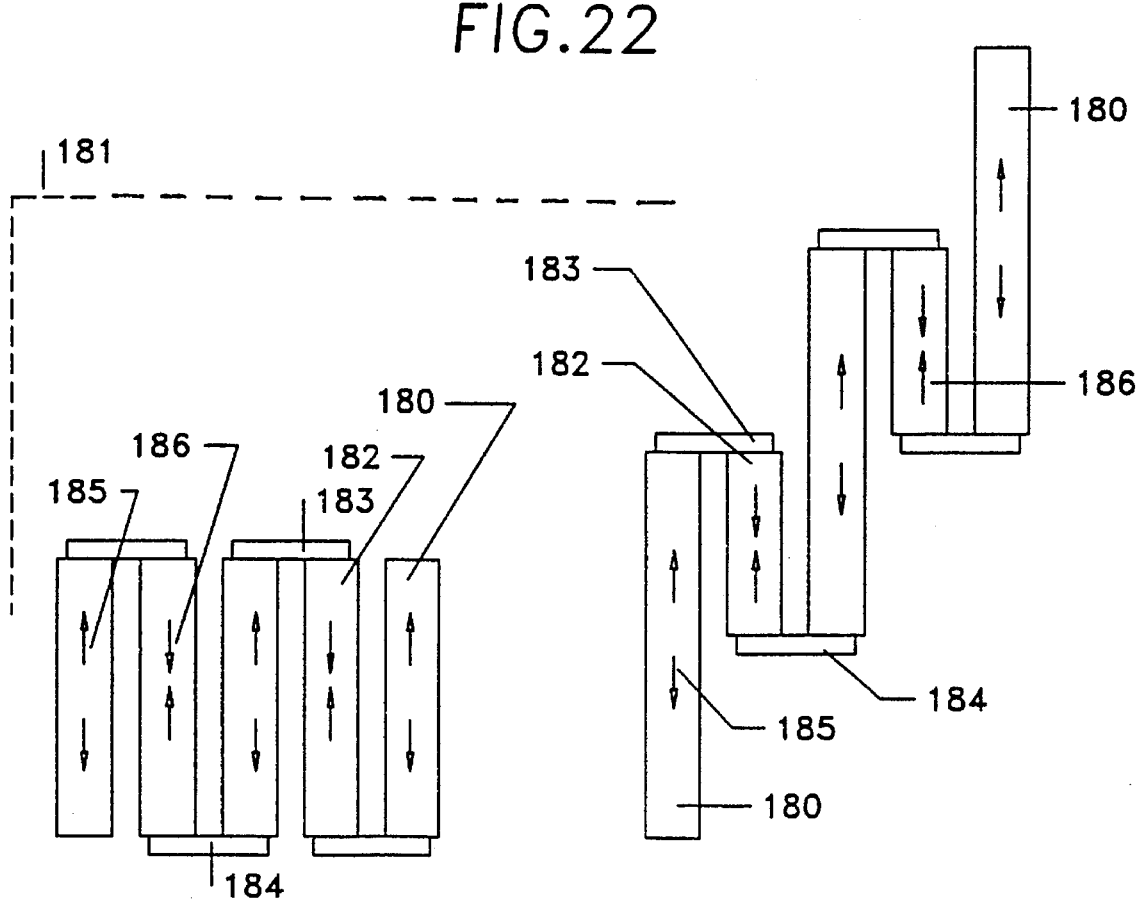
FIG. 23 is a schematic representation of a second design for telescoping microactuators according to the twelfth embodiment of the invention.

FIG. 23 is a schematic representation of a second design for telescoping microactuator array 181 according to the twelfth embodiment of the invention. It is similar to the previous embodiment except that contractive elements 182 form the connection between the top of one expansive element 180, via first telescopic connector 183, and the bottom of its neighbor to the right, via second telescopic connector 184. Now, when expansive elements 180 expand according to expanding arrows 185 and when contractive elements 182 contract, according to contracting arrows 186, the resulting displacement of the rightmost expansive element 180 is the sum of all the displacements of the component expansive elements 180 and contractive elements 182. This is shown on the right side of FIG. 23. It should be understood that the configuration of the various component actuators of a telescoping system could vary from one side to another, from outside to inside, or according to a cylindrical geometry. Also, the telescopic elements could act at the level of an individual force element 4 or at larger modular levels.

Figure 24:
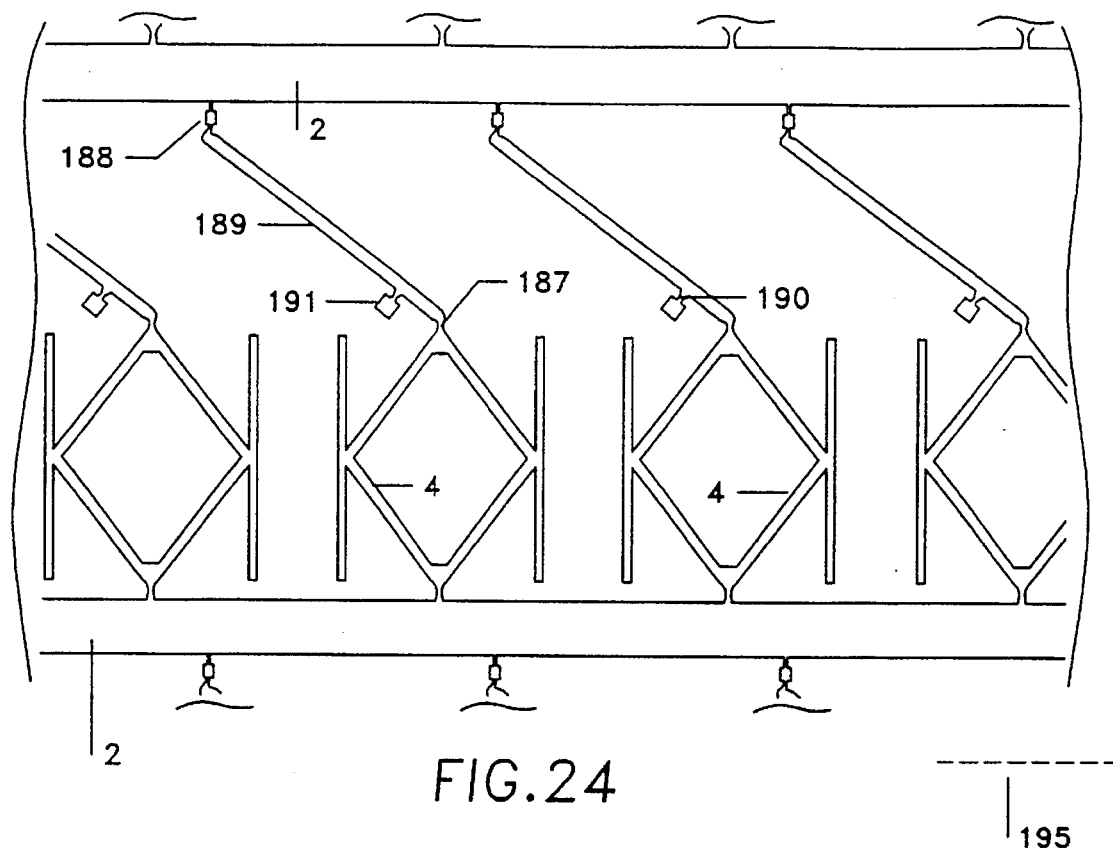
FIG. 24 is a top view of an a levered microactuator in its contracted state according to the thirteenth embodiment of the invention.

FIG. 24 is a top view of levered microactuator array 195, according to the thirteenth embodiment of the invention. It is similar in configuration and wiring to the first embodiment of FIG. 1 except that a lever principle is utilized to amplify displacement. The top of force element 4 is monolithically connected to lever 189 via first hinge 187. The other end of lever 189 is attached to beam 2 via second hinge 188. Lever 189 acts about fulcrum 191 via fulcrum hinge 190. The various hinges here are monolithic with their adjoining elements.

Figure 25:
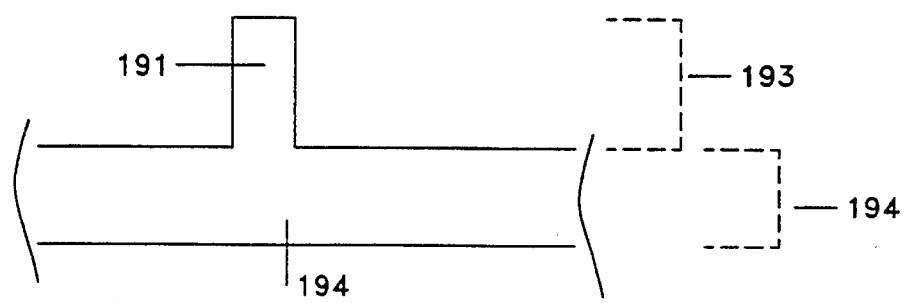
FIG. 25 is a side view of detail of a fulcrum hinge of the levered microactuator according to the thirteenth embodiment of the invention.

Detail of fulcrum 191 is shown in FIG. 25, which is a side view fulcrum 191. Fulcrum 191 must be rigidly attached to the lower of the two beams 2 shown. This is accomplished by fulcrum layer 192 which lies at a level indicated by fulcrum layer location 194 which is below actuator layer location 193, which is the level for the components shown in FIG. 24. Fulcrum layer 192 is in turn monolithically attached to the lower of the two beams 2 shown.

Having thus described the invention, what is claimed as new and desired to be secured by Letters Patent is:

1. An electromechanical microactuator comprising:

a plurality of beam frames arranged in an array which has a width and a height, wherein said beam frames extend laterally to form rows across said width of said array, a plurality of force elements of electrostatic nature arranged in an array, positioned between said beam frames, and acting to force said beam frames to move apart due to an attractive electrostatic force to increase said height of said array and to move together due to an attractive electrostatic force to decrease said height of said array, a wiring system including switching means located on said beam frames and on said force elements for distribution of electrical signals to activate said force elements.

2. The electromechanical micro-actuator of claim 1, wherein said wiring system comprises a plurality of conductive buslines extending continuously along portions of said beam frames from one end to the other end of said rows and a switching system for changing the voltage and polarity of said voltage applied to said conductive buslines.

3. The electromechanical micro-actuator of claim 1, wherein each of said force elements comprises:

a plurality of bending spacers connecting adjacent said beam frames, extending in a longitudinal direction, and rigidly attached at either end to adjacent beam frames, a plurality of conductive strips positioned on portions of said bending spacers, and a plurality of conductive feeder lines connecting said conductive strips to said conductive buslines, wherein the application of oppositely polarized voltage to each one of adjacent pairs of said conductive strips on said bending spacers causes attractive forces between said bending spacers which act to change the amount of bending of said bending spacers.

4. The electromechanical micro-actuator of claim 3, wherein each of said bending spacers further comprises:

an outer conductive strip on an outer side of bending spacer, an inner conductive strip on the inner side of said bending spacer, wherein said electromechanical micro-actuator and its component parts, when viewed from above, have a top side, a bottom side, a left side and a right side, wherein when a said bending spacer bends toward the left its outer side is its left side and its inner side is its right side, and connective conductive strips on each side of each said bending spacer, wherein said connective conductive strips connect said inner conductive strip with said outer conductive strip.

5. The electromechanical micro-actuator of claim 3, wherein each of said bending spacers further comprises a hammer-head in the mid-portion of said bending spacer, wherein said outer conductive strip is located on a side of said hammer-head.

6. The electromechanical micro-actuator of claim 4, wherein each of said bending spacers further comprises a plurality of multiple-bend bending spacers, wherein, each of said multiple-bend bending spacers, bends to the left and right a multiple number of times, wherein inner conductive strip and outer conductive strips are closer to their adjacent inner or outer conductive strip.

7. The electromechanical micro-actuator of claim 1, wherein each of said force elements comprises:

a plurality of first interlocking-L elements monolithically attached to and extending longitudinally downward from a first of said beam frames, a plurality of second interlocking-L elements monolithically attached to and extending longitudinally upward from a second of said beam frames which is located adjacent and below said first beam frame, a plurality of extensible positioners which connect said first interlocking-L element with a second said interlocking-L element on its left side and with a second said interlocking-L element on its right side, a plurality of conductive strips positioned on portions of said first interlocking-L elements, on portions of said second interlocking-L elements, and on portions of said beam frames, a plurality of conductive feeder lines connecting said conductive strips to said conductive buslines.

8. The electromechanical micro-actuator of claim 1, wherein each of said force elements comprises:

a plurality of interlocking-T elements monolithically attached to and extending longitudinally upward from a second of said beam frames, wherein each interlocking-T elements comprises a T-stem and a T-crossmember, a plurality of inverted interlocking-U elements monolithically attached to and extending longitudinally downward from a first of said beam frames which is located adjacent and longitudinally above said second beam frame, a plurality of extensible positioners which connect said inverted interlocking-U element with said interlocking-T element, a plurality of conductive strips positioned on portions of said bottom sections, on portions of said T-crossmembers, and on portions of said beam frames, a plurality of conductive feeder lines connecting said conductive strips to said conductive buslines.

9. The electromechanical micro-actuator of claim 8, wherein each of said force elements further comprises said beam frames which form a crenulated outline by virtue of periodic right-angle bends, wherein adjacent ones of said force elements are staggered with respect to each other.

10. The electromechanical micro-actuator of claim 7 wherein said force elements further comprise:

a first interlocking-L element further comprising a first L-tree, wherein said first L-tree comprises a first L-tree trunk and first multiple L-tree branches extending laterally from one side of said first L-tree trunk, and a second interlocking-L element further comprising a second L-tree trunk, wherein said second L-tree trunk comprises second multiple L-tree branches extending laterally from one side of said second L-tree trunk, wherein said first and second L-tree branches interlock with each other, and wherein said plurality of conductive strips are positioned on portions of said first and second L-tree branches.

11. The electromechanical micro-actuator of claim 8 wherein said force elements further comprise:

an interlocking-T element further comprising a T-tree wherein said T-tree comprises a T-tree trunk and multiple T-tree branches extending laterally from both sides of said T-tree trunk, and an inverted interlocking-U element further comprising a U-tree wherein said U-tree comprises a U-tree double-trunk and multiple U-tree branches extending laterally from both sides of said U-tree double-trunk, wherein said multiple T-tree branches interlock with said multiple U-tree branches, and wherein said plurality of conductive strips are positioned on portions of said multiple T-tree branches and on portions of said multiple U-tree branches.

12. The electromechanical micro-actuator of claim 2, wherein said beam frames further comprise:

a first guide element monolithically attached to a first beam frame and extending downward in said longitudinal direction, a second guide element monolithically attached to a second beam frame and extending longitudinally upward in said longitudinal direction, wherein said first and second guide elements are positioned immediately adjacent to and overlap each other, a first conductive strip covering a portion of said first guide element, a second conductive strip covering a portion of said second guide element, connective conductive strips joining said first and second conductive strips with said conductive buslines, and a switching system for changing the value and polarity of said voltage on said conductive buslines.

13. The electromechanical micro-actuator of claim 1, wherein adjacent ones of said beam frames and said force elements have a varying thicknesses.

14. The electromechanical micro-actuator of claim 2, wherein said switching system measures total capacitance of said force elements with said force elements measured in series.

15. The electromechanical micro-actuator of claim 2, wherein said switching system measures total capacitance of said force elements with said force elements measured in parallel said row by said row.

* * * * *